United States Patent [19]
DeKoning et al.

[11] Patent Number: 6,009,275
[45] Date of Patent: Dec. 28, 1999

[54] CENTRALIZED MANAGEMENT OF RESOURCES SHARED BY MULTIPLE PROCESSING UNITS

[75] Inventors: Rodney A. DeKoning, Wichita, Kans.; Timothy E. Hoglund, Colorado Springs, Colo.

[73] Assignees: Hyundai Electronics America, Inc., San Jose, Calif.; NCR Corporation, Dayton, Ohio

[21] Appl. No.: 08/729,193

[22] Filed: Oct. 15, 1996

Related U.S. Application Data

[63] Continuation of application No. 08/223,405, Apr. 4, 1994, abandoned.

[51] Int. Cl.$^6$ .................................................. G06F 13/00
[52] U.S. Cl. .......................... 395/727; 395/293; 395/732
[58] Field of Search ...................................... 395/727–732, 395/293–305, 974

[56] References Cited

U.S. PATENT DOCUMENTS

| | | | |
|---|---|---|---|
| 5,155,854 | 10/1992 | Flynn et al. | 395/725 |
| 5,193,197 | 3/1993 | Thacker | 395/725 |

(List continued on next page.)

FOREIGN PATENT DOCUMENTS

| | | |
|---|---|---|
| 4261840 | 5/1991 | European Pat. Off. . |
| 476252A | 3/1992 | European Pat. Off. . |

(List continued on next page.)

OTHER PUBLICATIONS

Webster's II New Riverside University Dictionary, 1988 pp. 965, 1278.
Dictionary of Computers, Information Processing & Telecommunications 1987 pp. 505 & 687.

*Primary Examiner*—Ayaz R. Sheikh
*Assistant Examiner*—Paul R. Myers
*Attorney, Agent, or Firm*—Townsend and Townsend and Crew LLP

[57] ABSTRACT

Resource allocation logic for a computer system including a plurality of processors which share access to, and control of, a plurality of resources, such as disk drive units or busses. The resource allocation logic coordinates the execution of requests received from the processors to avoid resource sharing inefficiencies and deadlock situations. The allocation logic maintains a "request" queue for each processor, seeking to satisfy all requests quickly and fairly. The queues contain an entry corresponding to each request received from its corresponding processor and an identification of resources that are required by the entry's corresponding request. The allocation logic also maintains a "resources available" status array of resources which are not currently in use by any processors, or are not reserved for future use by any processors. The logic repeatedly compares each entry in the request queues with the entries in the resources available status array to detect an entry in the request queue identifying resources all of which are contained in the resources available status array. Once the allocation logic can satisfy a particular request, it signals a grant to the requesting processor for the resources requested. The requested resources are removed from the resources available status array. Upon conclusion of execution of the granted request, the resources are again released to the resource allocation logic for utilization by other resource requests. Additionally, each request queue contains a list age indicating the relative age of each request queue with respect to the other request queues, and each entry in the request queues includes a request age indicating the relative age of each entry in a request queue with respect to other entries in the request queue. In examining the request queues to identify I/O requests for execution, priority is awarded to entries based on the relative ages of the request queues and request queue entries.

38 Claims, 6 Drawing Sheets

U.S. PATENT DOCUMENTS

| | | | |
|---|---|---|---|
| 5,253,347 | 10/1993 | Bagnoli et al. | 395/325 |
| 5,265,257 | 11/1993 | Simcoe et al. . | |
| 5,301,333 | 4/1994 | Lee | 395/725 |
| 5,303,391 | 4/1994 | Simcoe et al. | 395/725 |
| 5,313,641 | 5/1994 | Simcoe et al. | 395/725 |
| 5,418,967 | 5/1995 | Simcoe et al. | 395/725 |
| 5,457,735 | 10/1995 | Erickson | 379/58 |

FOREIGN PATENT DOCUMENTS

| | | |
|---|---|---|
| 0298793 | 1/1989 | France . |
| 6075843 | 8/1992 | Japan . |
| 2017363 | 3/1978 | United Kingdom . |

CENTRALIZED MANAGEMENT OF RESOURCES SHARED BY MULTIPLE PROCESSING UNITS

This is a continuation of application Ser. No. 08/223,405 filed Apr. 4, 1994, now abandoned.

The present invention relates to disk array storage systems and, more particularly, to a method for managing the operations of multiple disk array controllers which share access to the disk drive units within the array.

BACKGROUND OF THE INVENTION

Disk array storage devices comprising a multiplicity of small inexpensive disk drives, such as the 5¼ or 3½ inch disk drives currently used in personal computers and workstations, connected in parallel are finding increased usage for non-volatile storage of information within computer systems. The disk array appears as a single large fast disk to the host system but offers improvements in performance, reliability, power consumption and scalability over a single large magnetic disk.

Most popular RAID (Redundant Array of Inexpensive Disks) disk array storage systems include several drives for the storage of data and an additional disk drive for the storage of parity information. Thus, should one of the data or parity drives fail, the lost data or parity can be reconstructed. In order to coordinate the operation of the multitude of drives to perform read and write functions, parity generation and checking, and data restoration and reconstruction, many RAID disk array storage systems include a dedicated hardware controller, thereby relieving the host system from the burdens of managing array operations. An additional or redundant disk array controller (RDAC) can be provided to reduce the possibility of loss of access to data due to a controller failure.

Figure 1:
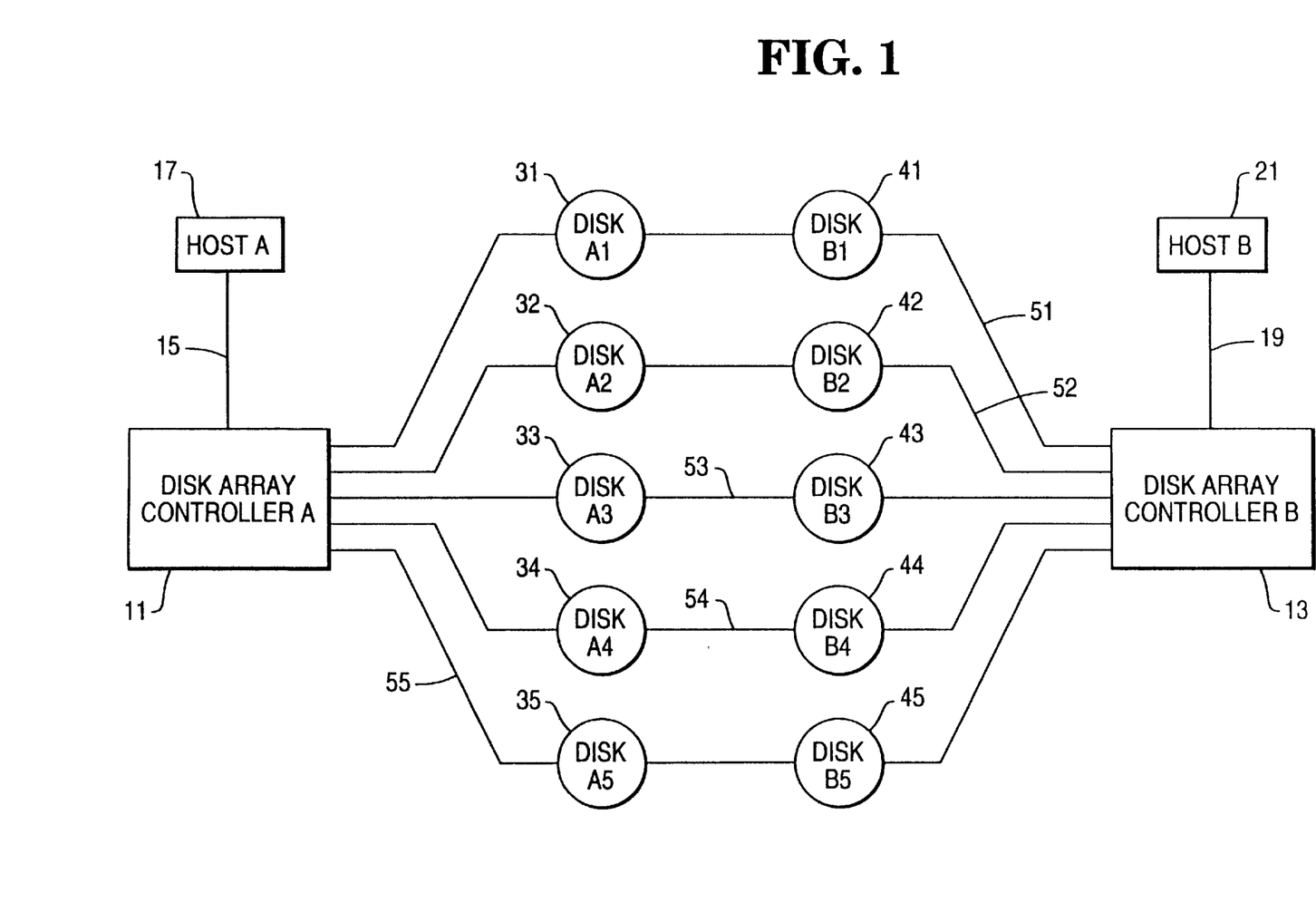
FIG. 1 is a block diagram representation of a disk array system including two SCSI host busses, dual disk array controllers; and ten disk drives accessed through five SCSI busses shared by the dual controllers.

FIG. 1 is a block diagram representation of a disk array storage system including dual disk array controllers 11 and 13. Array controller is connected through a SCSI host bus 15 to host system 17. Array controller 13 is likewise connected through a SCSI host bus 19 to a host system 21. Host systems 17 and 21 may be different processors in a multiple processor computer system. Each array controller 11 has access to ten disk drives, identified by reference numerals 31 through 35 and 41 through 45, via five SCSI busses 51 through 55. Two disk drives reside on each one of busses 51 through 55. Disk array controllers 11 and 13 may operate in one of the following arrangements:

(1) Active/Passive RDAC

All array operations are controlled by one array controller, designated the active controller. The second, or passive, controller is provided as a hot spare, assuming array operations upon a failure of the first controller.

(2) Active/Active RDAC—Non Concurrent Access of Array Drives

One controller has primary responsibility for a first group of shared resources (disk drives, shared busses), and stand-by responsibility for a second group of resources. The second controller has primary responsibility for the second group of resources and stand-by responsibility for the first group of resources. For example, disk array controller 11 may have primary responsibility for disk drives 31 through 35, while disk array controller has primary responsibility for disk drives 41 through 45.

(3) Active/Active RDAC—Concurrent Access of Array Drives

Each array controller has equal access to and control over all resources within the array.

Providing each array controller with equal access to and control over shared resources may lead to resource sharing inefficiencies or deadlock scenarios. For example, certain modes of operation require that subgroups of the channel resources be owned by one of the array controllers. Failure to possess all required resources concurrently leads to blockage of the controller until all resources have been acquired. In a multiple controller environment obtaining some but not all the required resources for a given transaction may lead to resource inefficiencies or deadlock in shared resource acquisition.

Likewise, an array controller that provides hardware assist in generating data redundancy requires simultaneous data transfer from more than one drive at a time. As data is received from the drives or the host, it is passed through a RAID striping ASIC to generate data redundancy information that is either stored in controller buffers or passed immediately to a drive for storage. So that the data may be passed through the RAID striping ASIC from the multiple data sources concurrently, each controller must have access to multiple selected drive channels concurrently. Deadlock can occur if no means to coordinate access to the drive channels exists.

Two examples are given below to illustrate the deadlock situation in a two disk array controller environment.

Deadlock Condition 1:

Referring to FIG. 1, disk array controllers 11 and 13 are seen to share five SCSI buses 51 through 55 and the ten drives that are connected to the SCSI buses. Disk array controller 11 is requested to perform an I/O operation to transfer data from drives disk drive 31 and 33. Simultaneously, disk array controller 13 is requested to perform an I/O operation to transfer data from disk drives 41 and 43. Both disk controllers attempt to access the drives they need concurrently as follows:

Array controller 11 acquires bus 5 1 and disk drive 3 1 and is blocked from acquiring bus 53 and disk drive 33.

Array controller 13 acquires bus 53 and disk drive 43 and continues arbitrating for bus 5 1 and disk drive 41.

Controller 1 now has SCSI bus 51 in use, and is waiting for disk drive 33 on SCSI bus 53 (owned by Controller 13). Controller 13 now has SCSI bus 53 in use, and is waiting for disk drive 41 on SCSI bus 51 (owned by Controller 11).

Figure 2:
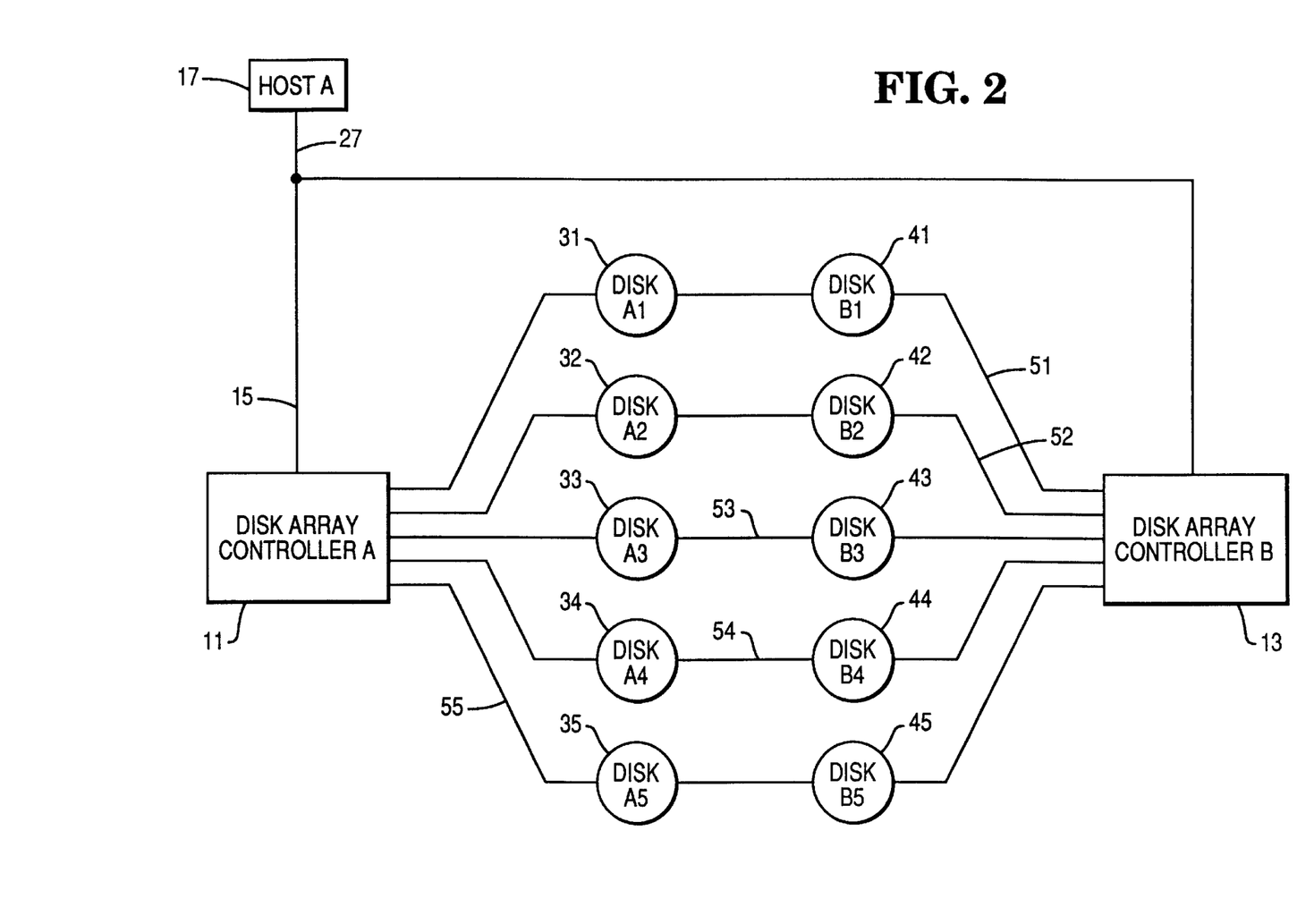
FIG. 2 is a block diagram representation of a disk array system including dual disk array controllers connected to a common SCSI host bus, and ten disk drives accessed through five SCSI busses shared by the dual controllers.

Deadlock Condition 2:

Deadlock can occur when multiple controllers are attached to the same host bus. This may occur when host SCSI bus 15 and host SCSI bus 19 are the same physical SCSI bus, identified as bus 27 in FIG. 2. Controller 11 is requested to perform an I/O operation requiring a transfer of data from disk drive 31 on SCSI bus 51 to host 17. Simultaneously, controller 13 is requested to perform an I/O operation requiring a transfer of data from disk drive 41 on SCSI bus 51 to host 21. Both controllers attempt access of the resources they need concurrently as follows:

Array controller 11 acquires the single Host SCSI bus, identified by reference numeral 27 and is blocked from acquiring SCSI bus 51 and disk drive 31.

Array controller 13 acquires SCSI bus 51 and disk drive 41, and is blocked from acquiring the host SCSI bus 15.

Controller 11 now has the host SCSI bus 27 in use, and is waiting for access to SCSI bus 51 (owned by Controller 13.) so that it can connect to disk drive 31. Controller 13 now has SCSI bus 51 in use, and is waiting for access to the host SCSI bus 27 (owned by Controller 1.).

A method and structure for coordinating the operation of multiple controllers which share access to and control over common resources is required to eliminate resource sharing inefficiencies and deadlock situations.

OBJECTS OF THE INVENTION

It is therefore an object of the present invention to provide a new and useful method and structure for coordinating the operation of multiple controllers which share access to and control over common resources.

It is another object of the present invention to provide such a method and structure which reduces or eliminates resource sharing inefficiencies and deadlock situations which arise in systems which include shared resources.

It is yet another object of the present invention to provide a new and useful disk array storage system including multiple active array controllers.

It is still a further object of the present invention to provide a method for coordinating the operation of multiple active controllers within a disk array which share access to and control over common resources.

It is an additional object of the present invention to provide a new and useful method for avoiding contention between controllers in a disk array system including multiple active controllers.

SUMMARY OF THE INVENTION

There is provided, in accordance with the present invention, a method for coordinating the execution of requests received from multiple requesting agents which share access to and control over common resources within a computer system in order to avoid resource sharing inefficiencies and deadlock situations. The method includes the steps of: (A) establishing a "request" queue, said request queue including an entry corresponding to each request received from the requesting agents, each entry including an identification of resources that are required by said entry's corresponding request; (B) maintaining a "resources available" status array, said resources available status array including an entry for each resource which is not currently in use by any requesting agent and is not currently reserved for future use by any requesting agent; (C) systematically comparing each entry in said request queue with the entries in said resources available status array to detect an entry in said request queue identifying resources all of which are contained in said resources available status array; (D) granting control of the resources associated with said entry detected in step C to the requesting agent providing the request corresponding to the entry detected in step C; and (E) executing the request corresponding to the entry identified in step C. The resources associated with the granted request are removed from the resources available status array during the execution of step (E). Upon conclusion of execution of the granted request, the resources are again placed in the resources available status array for utilization by other resource requests.

The described embodiment is incorporated into a disk array subsystem including multiple array controllers which share access to, and control over, multiple disk drives and control, address and data busses within the disk array. A request queue containing entries for I/O requests received from the host computer system is maintained for each array controller, the method of the present invention alternately examining entries in each request queue to detect an entry in either request queue identifying resources all of which are contained in the resources available status array. Additionally, each request queue contains a list age indicating the relative age of each request queue with respect to the other request queues, and each entry in the request queues includes a request age indicating the relative age of each entry in a request queue with respect to other entries in the request queue. In examining the request queues to identify I/O requests for execution, priority is awarded to entries based on the relative ages of the request queues and request queue entries.

The above and other objects, features, and advantages of the present invention will become apparent from the following description and the attached drawings.

DETAILED DESCRIPTION OF THE PREFERRED EMBODIMENT

Figure 3:
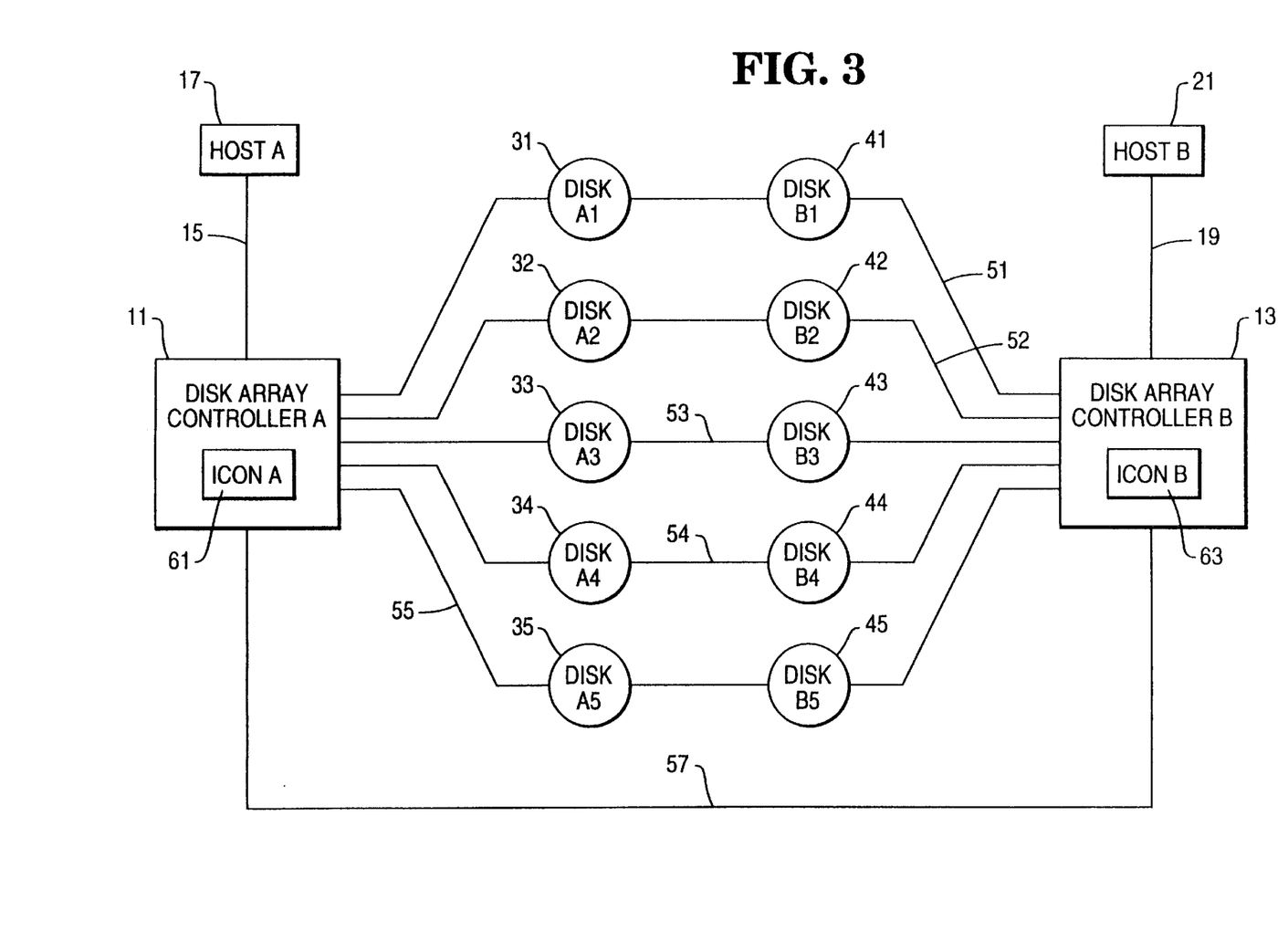
FIG. 3 is a block diagram representation of a disk array system including dual active controllers and a communication link between the controllers for providing communications and coordinating resource arbitration and allocation between the dual active disk array controllers.

A disk array system including dual active controllers constructed in accordance with a preferred embodiment of the present invention is shown in block diagram form in FIG. 3. In addition to the structure shown in the disk array system of FIG. 1, the system of FIG. 3 includes a dedicated communication link 57 connected between the array controllers 11 and 13, and an Inter-Controller Communication Chip application specific integrated circuit incorporated into each of the controllers, identified by reference numerals 61 and 63, respectively.

The communication link 57 and Inter-Controller Communication Chips provide communication between, and resource arbitration and allocation for the dual disk array controllers.

The Inter-Controller Communication Chip

Figure 4:
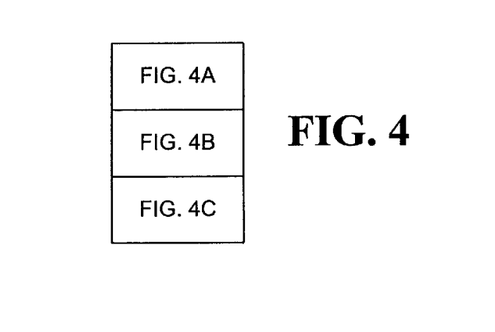
FIG. 4 is a block diagram of the ICON (Inter-Controller Communication Chip) ASIC (Application Specific Integrated Circuit) incorporated into each disk array controller of FIG. 3 for providing communications and coordinating resource arbitration and allocation between the dual active disk array controllers.
Figure 4A:
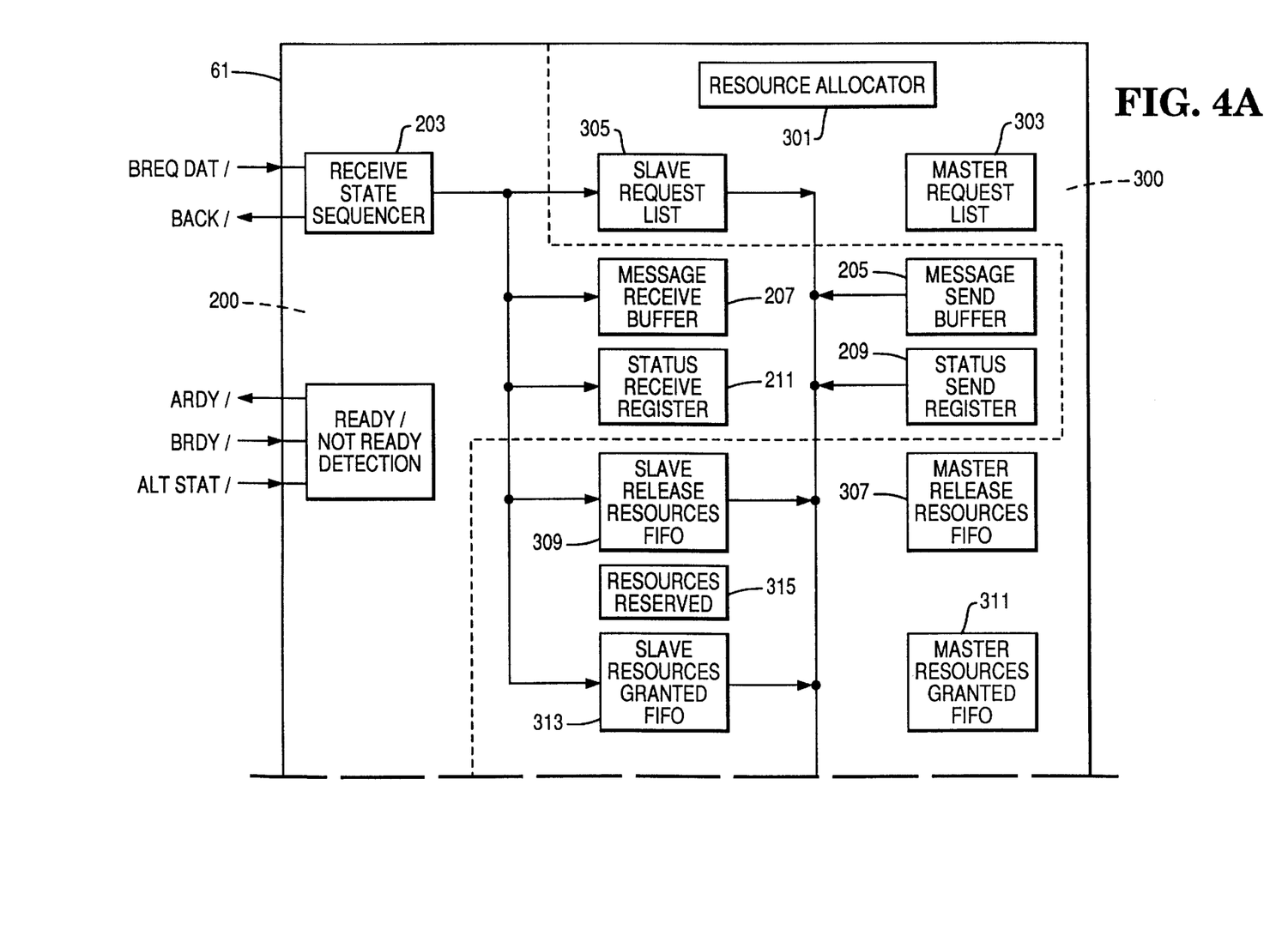
Figure 4B:
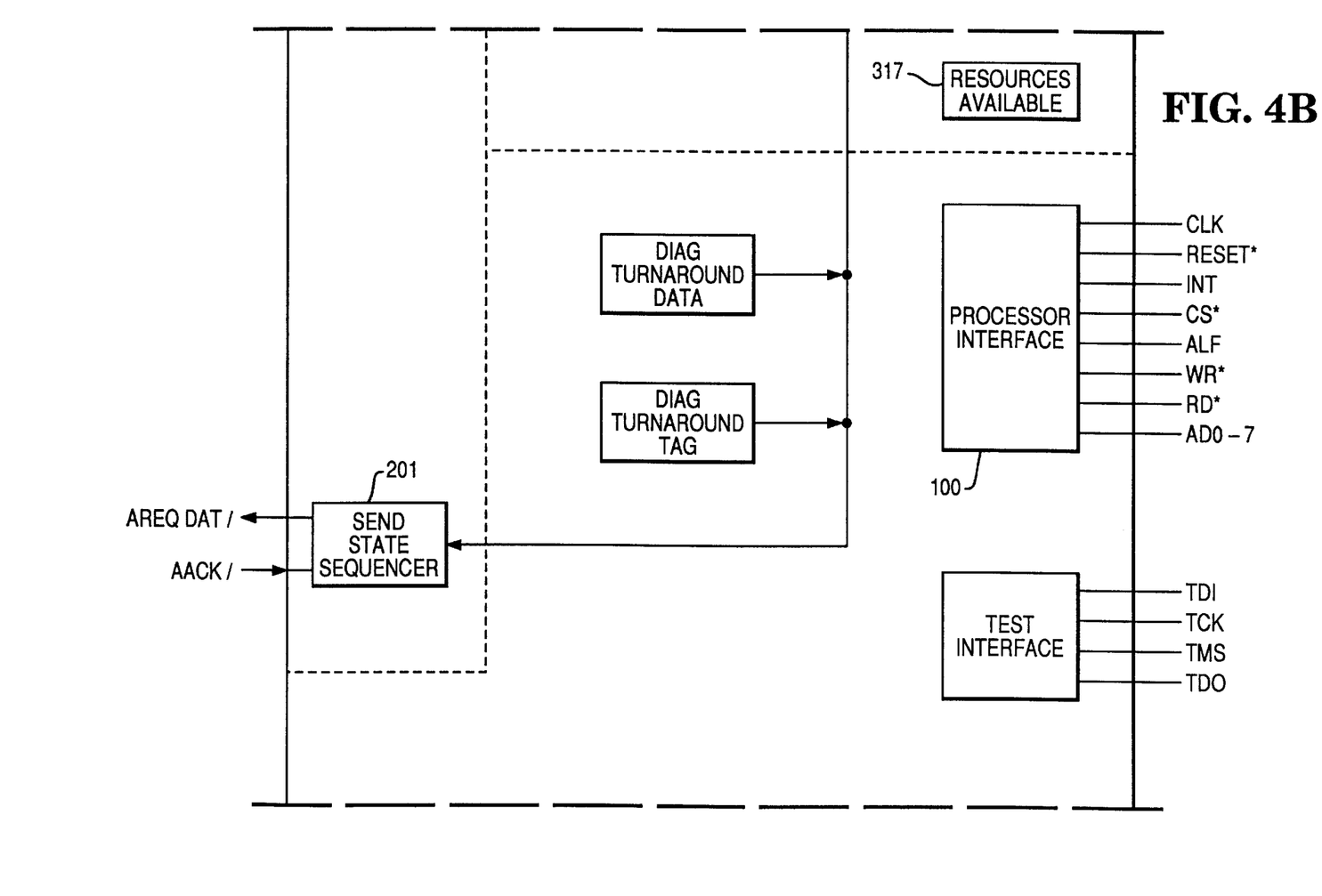
Figure 4C:
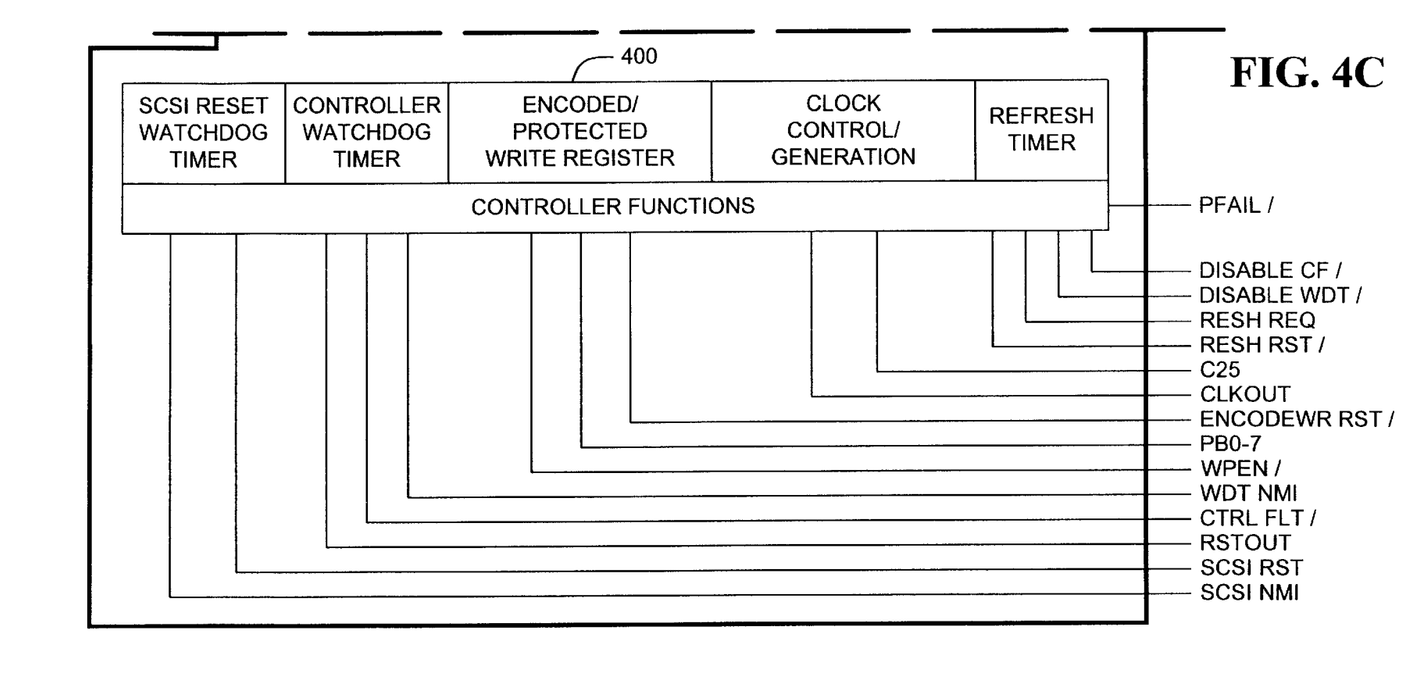

FIG. 4 is a block diagram of the Inter-Controller Communication Chip incorporated into each of the dual active array controllers 11 and 13 included within the disk array system shown in FIG. 3. The Inter-Controller Communication Chip (hereafter referred to as the ICON chip) contains all functions necessary to provide high speed serial communication and resource arbitration/allocation between two Disk Array controllers. The primary application for the ICON chip is in Disk Array systems utilizing redundant disk array controllers. Because the redundant controller configuration shares resources (disk drives and SCSI buses) between two controllers, a method of arbitrating for these common resources must be utilized in order to prevent deadlocks and to maximize system performance. The ICON chip contains a hardware implementation of a resource allocation algorithm which will prevent deadlocks and which strives to maximize system performance. In addition to performing resource arbitration/allocation, the ICON chip also provides a means of sending/receiving generic multiple byte messages between Disk Array controllers. The ICON chip includes the following logic modules:

Microprocessor Interface Control Logic 100

The microprocessor interface block allows an external microprocessor to configure and monitor the state of the ICON chip. Configuration and status information are maintained in registers within the ICON chip. The configuration, control, and status registers are designed to provide operating software with a wide range of functionality and diagnostic operations. Interrupt masking and control are also included in this functional block.

Inter-controller Communication Logic 200

The Inter-controller Communication block contains all structures and logic required to implement the inter-controller communication interface. This block includes the following structures/logic: Send State Sequencer 201, Receive State Sequencer 203, Message Send Buffer 205, Message Receive Buffer 207, Status Send Register 209, and Status Receive Buffer 211. These modules work together to form two independent unidirectional communication channels. Serialization and Deserialization of data packets occurs in Send State Sequencer 201 and Receive State Sequencer 203 modules. Serial data output from the Send State Sequencer 201 may be fed into the Receiver State Sequencer 203 module for a full diagnostic data turnaround.

The Inter-controller Communication Block 200 is used to send generic messages and status or to send specific request/grant/release resource messages between two Disk Array controllers.

Communication between pairs of ICON chips is provided by 6 signals. These signals are defined as follows:

TABLE 1

Communication Signal Descriptions

| Name | Type | Description |
| --- | --- | --- |
| ARDY/ | OUT | 'A' Port ready. This output is controlled by the ICON Ready bit in the Control Register and is monitored by the alternate controller. |
| BRDY/ | IN | 'B' Port ready. This input is used to monitor the Ready/Not Ready status of the alternate controller. |
| AREQ.DAT/ | OUT | 'A' Port Request/Serial Data. This output signal is used to request data transfer and then send serial data to the alternate controller in response to the 'A' Port Acknowledge signal. |
| BREQ.DAT/ | IN | 'B' Port Request/Serial Data. This input is used to receive serial data from the alternate controller. |
| AACK/ | IN | 'A' Port Acknowledge. This signal is received from the alternate controller as the handshake for a single data bit transfer. |
| BACK/ | OUT | 'B' Port Acknowledge. This output signal is sent to the alternate controller to control a serial receive data transfer operation. |

Resource Allocation Logic 300

The Resource Allocation block 300 contains all structures and logic required to manage up to 8 shared resources between two Disk Array controllers, referred to as the master and slave disk array controllers. These structures/logic include the Resource Allocator 301, two sets of Resource Request Lists (Master/Slave) 303 and 305, two sets of Release Resource FIFOs (Master/Slave) 307 and 309, two sets of Resources Granted FIFOs (Master/Slave) 311 and 313, and the Resource Scoreboard comprising resources allocated and resources available blocks 315 and 317, respectively.

The key element in this block is Resource Allocator 301. This block consists of a hardware implementation of an intelligent resource allocation algorithm. All other data structures in this block are directly controlled and monitored by the Resource Allocator 301. The Resource Allocator 301 present in the ICON chip for the master controller continually monitors the state of the Resource Request Lists 303 and 305, the Release Resource FIFOs 307 and 309, and Resource Scoreboard to determine how and when to allocate resources to either controller. The Resource Allocator 301 present in the ICON chip for the slave controller is not active except during diagnostic testing.

Controller Functions 400

The Controller Functions logic 400 provides several board-level logic functions in order to increase the level of integration present on the disk array controller design.

Communication Link and Protocol

This invention encompasses the establishment of a simple communication link and protocol between devices sharing resources, and a unique arbitration algorithm which is used for the management of the shared resources.

The communication link and protocol are used to request, grant, and release resources to or from the resource arbiter. The protocol requires the establishment among the devices sharing resources of a single master device, and one or more slave devices. The master/slave distinction is used only for the purposes of locating the active resource allocation logic 300. Although each controller includes resource allocation logic, this logic is only active in the master controller. In the discussion which follows, references to the resource allocation logic 300 and its components will refer to the active resource allocation logic and its components. Both master and slave devices retain their peer to peer relationship for system operations.

The active resource allocator 301 is implemented in the master device. A device formulates a resource request by compiling a list of resources that are required for a given operation. The resource request is then passed to the resource allocation logic 300. The resource allocation logic 300 maintains a list of requests for each device in the system, seeking to satisfy all requests quickly and fairly. Once the allocation logic can satisfy a particular request, it signals a grant to the requesting device for the resources requested. The device with the granted resource requests has access to the granted resources until it releases them. The release is then performed by sending a release message to the resource allocator to free the resources for consumption by other resource requests.

All resource requests, request granting, and request freeing involving a slave device is performed by sending inter-device messages, which include message type and data fields, between the master (where the active resource allocation logic is located) and the slave devices using the interface described above. All resource requests, request grants, and request freeing involving only the master device may be done within the local to the master device.

Shared Resource Management Algorithm

The resource allocation logic 300 located in the arbitrarily assigned master device includes a resource allocation algorithm and associated data structures for the management of an arbitrary number of shared resources between an arbitrary number of devices. The data structures and algorithm for sharing resources are discussed below.

Data Structures

For each device which requires shared resource management, a request queue, or list of resource requests, of arbitrary depth is maintained by the master device (master and slave request lists 303 and 305). Associated with each of the device request queues are two count values, a list age (which indicates the relative age of a device request queue with respect to the other request queues) and a request age (which indicates the relative age of the oldest entry in a single device's request queue with respect to other entries in the same request queue). In addition to the count values associated with each device request queue, two boolean flags are also maintained; a Request Stagnation flag and a List Stagnation flag. Request Stagnation TRUE indicates that the relative age of a device's oldest resource request has exceeded a programmable threshold value. List Stagnation TRUE indicates that the relative age of a device's request queue with respect to other devices' request queues has exceeded a programmable threshold value. Stagnation (Request or List) is mutually exclusive between all devices, only one device can be in the Stagnant state at any given time.

The master device also maintains the current state of resource allocation and reservation by tracking "Resources Available" and "Resources Reserved". "Resources Available" indicates to the resource allocation algorithm which resources are not currently in use by any device and are not currently reserved for future allocation. Any resources contained within the "Resources Available" structure (Resources Available block 317) are therefore available for allocation. "Resources Reserved" indicates to the resource allocation algorithm which resources have been reserved for future allocation due to one of the devices having entered the Stagnant state (Request Stagnation or List Stagnation TRUE). Once a device enters the Stagnant state, resources included in the stagnant request are placed into the "Reserved Resources" structure (Resource Reserved block 315) either by immediate removal from the "Resources Available" structure, or for resources currently allocated, at the time they are released or returned to the resource pool) and kept there until all resources included in the stagnant request are available for granting. Stagnation (Request or List) is mutually exclusive between all devices; only one device can be in the Stagnant state at any given time. The last two data structures used by the resource allocation algorithm are pointers to the currently selected device (generically termed TURN and LISTSELECT) which is having it's resource request queue being searched for a match with available resources.

Algorithm

Resource allocation fairness is provided using the above-defined data structures. The Request Stagnation flag as previously described is used to ensure fairness in granting resource requests within a single device. For example, assuming random availability of resources, a device which requests most resources in groupings of two could starve it's own requests for groupings of five resources from the same resource pool unless a mechanism for detecting and correcting this situation exists. The request age counts with their associated thresholds ensure that resource requests within a single device will not be starved or indefinitely blocked.

The List Stagnation flag is used to ensure fairness in granting resource requests between devices. For example, a device which requests resources in groupings of two could starve another device in the system requesting groupings of five resources from the same resource pool. The list age counts with their associated thresholds ensure that all devices' requests will be serviced more fairly and that a particular device will not become starved waiting for resource requests.

Two modes of operation are defined for the resource allocation algorithm: Normal mode and Stagnant mode. Under Normal mode of operation, no devices have entered the Stagnant state and the algorithm uses the TURN pointer in a round-robin manner to systematically examine each of the device's request queues seeking to grant any resources which it can (based on resource availability) with priority within a device request queue based on the relative ages of the request entries. Upon transition to the Stagnant mode (a device has enter the Stagnant state), the TURN pointer is set to the Stagnant device and the resource allocation algorithm will favor granting of the request which caused the Stagnant state by reserving the resources included in the stagnant request such that no other device may be granted those resources. Although the TURN pointer is effectively frozen to the Stagnant device, other device request queues and other entries within the Stagnant device's request queue will continue to search for resource matches based on what is currently available and not reserved using the secondary list pointer (LISTSELECT).

The actual resource grant operation includes the removal of granted resources from the "Resources Available" structure along with the clearing of "Resources Reserved" structure (if the resource grant was for a Stagnant request). Resource freeing or release operations are accomplished simply by updating the "Resources Available" structure.

A Specific Resource Algorithm implementation

The following is an implementation of the algorithm using the "C" programming language for a sample case of a master and a single slave device with the following characteristics:

Resource Request Queue depth for both devices=4

Number of Shared Resources between the devices=8

As stated earlier, the number of devices, number of shared resources, and queue depth are strictly arbitrary. The functionality contained and implied by this algorithm is implemented in the device sharing the resources designated the master. The description describes the service poll used to look for a resource request to be granted from any controller. The release operation is simply provided by allocating the resources to be released to the channels available variable.

Although this example implementation uses the "C" programming language, the implementation may take any form, such as other programming languages, hardware state machine implementations, etc.

```
void resource_allocation_algorithm(void)    /* begin resource allocation algorithm */
{
int service_loops;
resource_operation *stagnant_operation;
```

```
/* while ((q_head_is_not_empty(slave_list)) && (q_head_is_not_empty(master_list)))
*/
  for (service_loops = 0; service_loops < 4: service_loops++)
    {
    if (service_loops == 0)
      {
      if ((!master_request_stagnation) && (!master_list_stagnation) &&
        (!slave_request_stagnation) && (!!slave_list_stagnation))
        {
        if (last_serviced == MASTER)
          turn = SLAVE;
        else
          turn = MASTER;
        }
      }
    if (turn == MASTER)
      {
      if (!(q_head_is_not_empty(master_list)))
        {
        master_list_age = 0;
        turn = SLAVE;
        continue;
        }
      if ((!master_list_stagnation) && (!master_request_stagnation))
        {
        if (acquire_from_master())
          {
          if (oldest_master_serviced)
            {
            turn = SLAVE;
            master_request_age = 0;
            }
          else
            {
            master_request_age++;
            if (master_request_age >= request_threshold)
              {
              num_master_req_stagnation++;
              master_request_stagnation = TRUE;
              }
            else
              {
              turn = SLAVE;
              }
            }
          /* a request from the master queue was serviced */
          master_list_age = 0;
          slave_list_age++;
          if ((slave_list_age >=
list_threshold)&&(!master_request_stagnation))
            {
            if (q_head_is_not_empty(slave_list))
              {
              num_slave_list_stagnation++;
              slave_list_stagnation = TRUE;
              turn = SLAVE;
              }
            }
          }
        else
          {
          /* no master queue request was serviced */
          turn = SLAVE;
          }
        }
      else
        {
        /* master_list_stagnation or master_request_stagnation */
        stagnant_operation = (resource_operation*)master_list->head;
        slave_list_age = 0;
        if (acquire_from_master())
          {
          if (oldest_master_serviced)
            {
            turn = SLAVE;
            master_list_stagnation = FALSE;
            master_request_stagnation = FALSE;
            slave_list_age++;
            master_request_age = 0;
            master_list_age = 0;
```

-continued

```
        }
      }
     else
      {
       if (acquire_from_slave())
        {
         slave_list_age = 0;
         if (oldest_slave_serviced)
          slave_request_age = 0;
        }
      }
    }
  }
 else
  {
   /* turn = SLAVE */
   if (!(q_head_is_not_empty(slave_list)))
    {
     slave_list_age = 0;
     turn = MASTER;
     continue;
    }
   if ((!slave_list_stagnation) && (!slave_request_stagnation))
    {
     if (acquire_from_slave())
      {
       if (oldest_slave_serviced)
        {
         turn = MASTER;
         slave_request_age = 0;
        }
       else
        {
         slave_request_age++;
         if (slave_request_age >= request_threshold)
          {
           num_slave_req_stagnation++;
           slave_request_stagnation = TRUE;
          }
         else
          {
           turn = MASTER;
          }
        }
       /* a request from the slave queue was serviced */
       slave_list_age = 0;
       master_list_age++;
       if ((master_list_age >= list_threshold) &&
           (!slave_request_stagnation))
        {
         if (q_head_is_not_empty(master_list))
          {
           num_master_list_stagnation++;
           master_list_stagnation = TRUE;
           turn = MASTER;
          }
        }
      }
     else
      {
       /* no slave queue request was serviced */
       turn = MASTER;
      }
    }
   else
    {
     /* slave_list_stagnation or slave_request_stagnation */
     stagnant_operation = (resource_operation *)slave_list->head;
     master_list_age = 0;
     if (acquire_from_slave())
      {
       if (oldest_slave_serviced)
        {
         turn = MASTER;
         slave_list_stagnation = FALSE;
         slave_request_stagnation = FALSE;
         master_list_age++;
         slave_request_age = 0;
         slave_list_age = 0;
        }
```

```
      }
    else
      {
      if (acquire_from_master())
        {
        master_list_age = 0;
        if (oldest_master_serviced)
          master_request_age = 0;
        }
      }
    }
   }
  }
}
/************************************************************
***/
status acquire_from_master()
/************************************************************
***/
{
resource_operation *list_end, * operation, *first_operation;
node *operation_node;
int temp_channels_available;
int first_op_channels_available, other_op_channels_available;
oldest_master_serviced = FALSE;
if (q_head_is_not_empty(master_list))
  {
  list_end = (resource_operation *)master_list;
  first_operation = operation = (resource_operation *)master_list->head;
  first_op_channels_available = channels_available;
  other_op_channels_available = channels_available;
  if (master_list_stagnation || master_request_stagnation)
    {
    other_op_channels_available =
      channels_available ^ (channels_available & operation->channel_map);
    }
  if (slave_list_stagnation || slave_request_stagnation)
    {
    first_op_channels_available =
    other_op_channels_available =
      channels_available ^ (channels_available & operation->channel_map);
    }
  do
    {
    operation_node = (node *)operation;
    if (operation == first_operation)
      temp_channels_available = first_op_channels_available;
    else
      temp_channels_available = other_op_channels_available;
    if (operation->channel_map == (operation->channel_map &
        temp_channels_available))
      {
      /* channels are available for this operation; grant it */
      unlink_node(operation_node);
      link_q_tail(master_granted_list, operation_node);
      channels_available ^= operation->channel_map;
      if (operation == first_operation)
        oldest_master_serviced = TRUE;
      last_serviced = MASTER;
      age_request_age(master_list);
      check_channel_use();
      return(TRUE);
      }
    operation = (resource_operation *)operation_node->next;
    }
  while (operation != list_end);
  return(FALSE);
  }
else
  {
  return(FALSE);
  }
}
/************************************************************
***/
status acquire_from_slave()
/************************************************************
***/
{
resource_operation *list_end, *operation, *first_operation;
```

```
    node *operation_node;
    int temp_channels_available;
    int first_op_channels_available, other_op_channels_available;
    oldest_slave_serviced = FALSE;
    if (q_head_is_not_empty(slave_list))
    {
      list_end = (resource_operation *)slave_list;
      first_operation = operation = (resource_operation *)slave_list->head;
      first_op_channels_available = channels_available;
      other_op_channels_available = channels_available;
      if (slave_list_stagnation || slave_request_stagnation)
      {
        other_op_channels_available =
          channels_available ^ (channels_available & operation->channel_map);
      }
      if (master_list_stagnation || master_request_stagnation)
      {
        first_op_channels_available =
        other_op_channels_available =
          channels_available ^ (channels_available & operation->channel_map);
      }
      do
      {
        operation_node = (node *)operation;
        if (operation == first_operation)
          temp_channels_available = first_op_channels_available;
        else
          temp_channels_available = other_op_channels_available;
        if (operation->channel_map == (operation->channel_map &
          temp_channels_available))
        {
          /* channels are available for this operation; grant it */
          unlink_node(operation_node);
          link_q_tail(slave_granted_list, operation_node);
          channels_available ^= operation->channel_map;
          if (operation == first_operation)
            oldest_slave_serviced = TRUE;
          last_serviced = SLAVE;
          age_request_age(slave_list);
          check_channel_use();
          return(TRUE);
        }
        operation = (resource_operation *)operation_node->next;
      }
      while (operation != list_end);
      return(FALSE);
    }
    else
    {
      return(FALSE);
    }
  }                /* end resource allocation algorithm */
```

Explanations and definitions for terms used in the above algorithm are provided below:

service_loops—the number of requests that can be outstanding at any one time.

master_request_stagnation—the state entered when the master ICON chip has serviced the slave icon requests too many times without servicing a master ICON's request. (Inter-ICON fairness parameter)

master_list_stagnation—the state entered when a request on the master ICON's request list is 'aged' beyond a configurable threshold relative to other requests being serviced in the master ICON's request queue. (This is used to promote Intra-ICON list request fairness to ensure starvation within the master ICON's list is avoided because of a request requiring a large number of resources waiting behind many requests requiring only small numbers of resources.)

slave_request_stagnation—the state entered when the master ICON chip has serviced the master ICON's requests too many times without servicing a slave ICON's request. (Inter-ICON fairness parameter)

slave_list_stagnation—the state entered when a request on the slave ICON's request list is 'aged' beyond a configurable threshold relative to other requests being serviced in the slave ICON's request queue. (This is used to promote Intra-ICON list request fairness to ensure starvation within the slave ICON's request list is avoided because of a request requiring a large number of resources waiting behind lots of requests requiring only small numbers of resources.)

last_serviced—a mechanism for providing fairness in servicing the least recently serviced controller.

turn—indicates which list will be looked at first when servicing requests.

master_list_age—the relative age of the request list for the master as compared to the number of requests serviced from the slave's list. It is used to ensure that the master is serviced at worst case, after some number of requests have been serviced from the slave. When the master list age exceeds a threshold, the master_request_stagnation state is entered into.

master_request_age—the relative age of the oldest member of the master list when compared to the number of requests serviced from the master's list. It is used to ensure that the oldest request on the master's list is serviced at worst case, after some number of other requests have been serviced within the master list. When the master request age exceeds a threshold, the master_list_stagnation state is entered into.

slave_list_age—the relative age of the request list for the slave as compared to the number of requests serviced from the master's list. It is used to ensure that the slave is serviced at worst case, after some number of requests have been serviced from the master. When the slave list age exceeds a threshold, the slave_request_stagnation state is entered into.

slave_request_age—the relative age of the oldest member of the slave list when compared to the number of requests serviced from the slave's list. It is used to ensure that the oldest request on the slave's list is serviced at worst case, after some number of other requests have been serviced within the slave list. When the slave request age exceeds a threshold, the slave_list_stagnation state is entered into.

The algorithm presented above, together with the description of the invention provided earlier, should be readily understood by those skilled in the art as providing a method for managing the operations of multiple disk array controllers which share access to the disk drive units, busses, and other resources within the array.

Although the presently preferred embodiment of the invention has been described, it will be understood that various changes may be made within the scope of the appended claims.

What is claimed is:

1. In a computer system including a plurality of requesting agents and a plurality of resources, said requesting agents sharing access to and control over said resources, a method for coordinating the execution of I/O requests received from requesting agents to avoid resource sharing inefficiencies and deadlock situations, said method comprising the steps of:

(A) establishing a request queue comprising a list of entries wherein each of said entries corresponds to an I/O request received from said requesting agents, and wherein each of said entries includes an identification of resources that are required by the corresponding I/O request;

(B) maintaining a resources available status array, said resources available status array including an entry for each resource which is not currently in use by any requesting agent and is not currently reserved for future use by any requesting agent;

(C) systematically comparing each entry in said request queue with the entries in said resources available status array to detect an entry in said request queue identifying resources all of which are contained in said resources available status array;

(D) granting control of the resources associated with said entry detected in step C to the requesting agent providing the I/O request; and (E) executing the I/O request corresponding to the entry identified in step C.

2. The method for coordinating the execution of I/O requests according to claim 1, further comprising the step of:

removing from said resources available status array the entries for each resource which is associated with said entry detected in step C upon the completion of step C.

3. The method for coordinating the execution of I/O requests according to claim 2, further comprising the step of:

returning to said resources available status array the entries for each resource which is associated with said entry detected in step C upon the completion of step E.

4. The method for coordinating the execution of I/O requests according to claim 1, wherein each entry in said request queue includes a request age indicating the relative age of each entry in the request queue with respect to other entries in the request queue, said method further including the step of:

granting priority to an entry in the request queue based on the relative ages.

5. The method for coordinating the execution of I/O requests according to claim 1, wherein:

said resources include disk drives within a disk array; and said requesting agents comprise disk array controllers each of which share access to and control over said disk drives.

6. In a computer system including a plurality of requesting agents and a plurality of resources, said requesting agents sharing access to and control over said resources, a method for coordinating the execution of I/O requests received from requesting agents to avoid resource sharing inefficiencies and deadlock situations, said method comprising the steps of:

(A) establishing a request queue comprising a list of entries wherein each of said entries corresponds to an I/O request received from said requesting agents, and wherein each of said entries includes an identification of resources that are required by the corresponding I/O request;

(B) maintaining a resources available status array, said resources available status array including an entry for each resource which is not currently in use by any requesting agent and is not currently reserved for future use by any requesting agent;

(C) systematically comparing each entry in said request queue with the entries in said resources available status array to detect an entry in said request queue identifying resources all of which are contained in said resources available status array;

(D) granting control of the resources associated with said entry detected in step C to the requesting agent providing the I/O request; and (E) executing the I/O request corresponding to the entry identified in step C, wherein said resources include busses within said computer system.

7. The method for coordinating the execution of I/O requests according to claim 1, wherein:

each entry within said request queue further includes a request age indicating the relative age of each entry in said request queue with respect to other entries in the request queue; and said method further includes the steps of:

examining said request ages to identify any entry having a request age which exceeds a predetermined request age value; and removing from said resources available status array the entries for each resource which is associated with said entry having a request age which exceeds said predetermined request age value, reserving the resources for use with the requesting agent and request associated with the entry having a request age which exceeds said predetermined request age value.

8. The method for coordinating the execution of I/O requests according to claim 1, wherein:

a request queue is maintained for each requesting agent in said computer system; and said step of systematically comparing each entry in said request queue with the entries in said resources available status array includes the step of alternately examining the entries in each request queue to detect an entry in said request queues identifying resources all of which are contained in said resources available status array.

9. In a computer system including a plurality of requesting agents and a plurality of resources, said requesting agents sharing access to and control over said resources, a method for coordinating the execution of I/O requests received from requesting agents to avoid resources sharing inefficiencies and deadlock situations, said method comprising the steps of:

(A) establishing a request queue comprising a list of entries wherein each of said entries corresponds to an I/O request received from said requesting agents, and wherein each of said entries includes an identification of resources that are required by the corresponding I/O request;

(B) maintaining a resources available status array, said resources available status array including an entry for each resource which is not currently in use by any requesting agent and is not currently reserved for future use by any requesting agent;

(C) systematically comparing each entry in said request queue with the entries in said resources available status array to detect an entry in said request queue identifying resources all of which are contained in said resources available status array;

(D) granting control of the resources associated with said entry detected in step C to the requesting agent providing the I/O request; and (E) executing the I/O request corresponding to the entry identified in step C, wherein said requesting agents are disk array controllers within a disk array subsystem within said computer system; and said resources are disk drives and busses within said disk array subsystem.

10. In a disk array system including a plurality of disk array controllers and a plurality of disk drives and busses under the control of a plurality of processors, a method for coordinating the operation of said disk array controllers, said method comprising the steps of:

(A) establishing a request queue for each disk array controller, each request queue including an entry corresponding to an I/O request received by said disk array system, each entry including an identification of resources that are required by said entry's corresponding I/O request wherein said resources includes disk drives and busses within said disk array system;

(B) maintaining a status array, said status array including an entry for each disk drive and bus which is not currently in use by any disk array controller and is not currently reserved for future use by any disk array controller;

(C) systematically comparing each entry in said request queues with the entries in said status array to detect an entry in said request queues identifying resources all of which are contained in said status array;

(D) granting control of resources identified by said entry detected in step C to the disk array controller associated with the request queue; and (E) executing the I/O request corresponding to the entry identified in step C.

11. The method for coordinating the execution of I/O requests according to claim 10, wherein:

each entry within said request queue further includes a request age indicating the relative age of each entry in said request queue with respect to other entries in the request queue; and said method further includes the steps of:

examining said request ages to identify any stagnant entry having a request age which exceeds a predetermined request age value; and removing from said status array the entries for each resource which is associated with said entry having a request age which exceeds said predetermined request age value, and reserving the disk drives for use with the I/O request associated with the stagnant entry.

12. The method for coordinating the execution of I/O requests according to claim 10, wherein:

said step of systematically comparing each entry in said request queue with the entries in said status array includes the step of alternately examining the entries in each request queue to detect an entry in said request queues identifying resources all of which are contained in said status array.

13. The method for coordinating the execution of I/O requests according to claim 10, wherein:

each request queue further includes a list age indicating the age of the oldest entry in the request queue;

said step of systematically comparing each entry in said request queue with the entries in said resources available status array includes the steps of:

examining said list ages to identify any request queue having a list age which exceeds a predetermined list age value; and if a request queue is identified as having a list age which exceeds said predetermined list age, systematically comparing the entries in the request queue identified as having a list age which exceeds said predetermined list age only until the list age for the request queue is below said predetermined list age value.

14. In a computer system including a plurality of requesting agents and a plurality of resources, said requesting agents sharing access to and control over said resources, a method for coordinating the execution of I/O requests received from requesting agents, said method comprising the steps of:

(A) establishing a request queue comprising a list of entries wherein each of said entries corresponds to an I/O request received from said requesting agents, and wherein each of said entries includes an identification of resources that are required by the corresponding I/O request;

(B) maintaining a status array, said status array including an entry for each resource which is available;

(C) systematically comparing each entry in said request queue with the entries in said status array to detect an entry in said request queue identifying resources all of which are available;

(D) executing the I/O request corresponding to the entry identified in step C.

15. The method for coordinating the execution of I/O requests according to claim 14, wherein each entry in said request queue includes a request age indicating the relative age of each entry in the request queue with respect to other entries in the request queue, said method further including the step of granting priority to an entry in the request queue based on the relative ages.

16. The method for coordinating the execution of I/O requests according to claim 14, wherein each entry within said request queue further includes a request age indicating the relative age of each entry in said request queue with respect to other entries in the request queue, said method further includes the steps of:

examining said request ages to identify any entry having a request age which exceeds a predetermined request age value; and removing from said status array the entries for each resource which is associated with said entry having a request age which exceeds said predetermined request age value.

17. The method for coordinating the execution of I/O requests according to claim 14, wherein a request queue is maintained for each requesting agent in said computer system, said step of systematically comparing each entry in said request queue with the entries in said status array includes the step of alternately examining the entries in each request queue to detect an entry in said request queues identifying resources all of which are available.

18. The computer system of claim 6, wherein a request queue is maintained for each requesting agent in said computer system; and said step of systematically comparing each entry in said request queue with the entries in said resources available status array includes the step of alternately examining the entries in each request queue to detect an entry in said request queues identifying resources all of which are contained in said resources available status array.

19. The computer system of claim 9, wherein a request queue is maintained for each requesting agent in said computer system; and said step of systematically comparing each entry in said request queue with the entries in said resources available status array includes the step of alternately examining the entries in each request queue to detect an entry in said request queues identifying resources all of which are contained in said resources available status array.

20. The method of claim 1 wherein said method further comprises the step of:

(F) releasing said resources associated with said entry detected in step C in response to completion of execution of said I/O request in step E.

21. The method of claim 20 wherein one of said plurality of requesting agents is designated as a master and each of the remainder of said plurality of requesting agents is designated as a slave, and wherein the method further comprises the step of:

exchanging messages between said master and said slaves to perform steps B, C, D, and F of the method.

22. The method of claim 10 wherein said method further comprises the step of:

(F) releasing said resources associated with said entry detected in step C in response to completion of execution of said I/O request in step E.

23. The method of claim 22 wherein one of said disk array controllers is designated as a master controller and each of the remainder of said plurality of disk array controllers is designated as a slave controller, and wherein the method further comprises the step of:

exchanging messages between said master and said slaves to perform steps B, C, D, and F of the method.

24. A system for coordinating the activity of a plurality of controllers in a disk array subsystem having a plurality of disk drives, busses, and processors associated therewith, said system comprising:

a request queue comprising a list of entries wherein each of said entries corresponds to an I/O request received by a controller in said disk array subsystem, wherein each of said entries includes an identification of resources required to execute the corresponding I/O request, and wherein said resources includes disk drives and busses in said disk array subsystem;

a status array having a plurality of entries, each entry identifying a disk drive or bus not currently in use by any of said plurality of controllers;

control means, associated with said request queue and with said status array, for systematically comparing each entry in said request queue with the entries in said status array to detect an entry in said request queue identifying resources all of which are contained in entries of said status array; and means, within said control means, for granting control to one of said plurality of controllers of said resources identified by the detected entry in said request queue.

25. The system of claim 24 further comprising:

means, within said one of said plurality of controllers, for releasing control of said resources granted to said one of said plurality of controllers.

26. The system of claim 25 further comprising:

communication means connecting each of said plurality of controllers for exchanging messages among said plurality of controllers.

27. The system of claim 26 wherein said messages include resource request messages, resource grant messages, and resource release messages.

28. The system of claim 27 wherein each of said plurality of controllers includes request means for transmitting a resource request message to said control means identifying the requesting one of said plurality of controllers and identifying the resources requested for use by said requesting one of said plurality of controllers.

29. The system of claim 28 wherein said means for granting includes means for transmitting resource grant message to said requesting one of said plurality of controllers.

30. The system of claim 24 further comprising:

a plurality of request queues, each having a plurality of entries and each of said plurality of request queues corresponding to one of said plurality of controllers, wherein said control means is associated with each of said plurality of request queues and with said status array, for systematically comparing each entry in each of said plurality of request queues with the entries in said status array to detect an entry in one of said plurality of request queues identifying resources all of which are contained in entries of said status array.

31. In a computer system having a plurality of requesting agents and a plurality of resources, said plurality of requesting agents sharing access to and control over said plurality of resources, a system for coordinating the the execution of I/O requests received from said plurality of requesting agents to avoid resource sharing inefficiencies and deadlock situations, said system comprising:

a request queue comprising a list of entries wherein each of said entries corresponds to an I/O request received from said plurality of requesting agents, and wherein each of said entries includes an identification of resources required to execute the corresponding I/O request;

a status array having a plurality of entries, each entry identifying at least one of said plurality of resources not currently in use by any of said plurality of requesting agents;

control means, associated with said request queue and with said status array, for systematically comparing each entry in said request queue with the entries in said status array to detect an entry in said request queue identifying resources all of which are contained in entries of said status array; and means, within said control means, for granting control to one of said plurality of requesting agents of said resources identified by the detected entry in said request queue.

32. The system of claim 31 further comprising:

means, within said one of said plurality of requesting agents, for releasing control of said resources granted to said one of said requesting agents.

33. The system of claim 32 further comprising:

communication means connecting each of said plurality of requesting agents for exchanging messages among said plurality of requesting agents.

34. The system of claim 33 wherein said messages include resource request messages, resource grant messages, and resource release messages.

35. The system of claim 34 wherein each of said plurality of requesting agents includes request means for transmitting a resource request message to said control means identifying the requesting one of said plurality of requesting agents and identifying the resources requested for use by said requesting one of said plurality of requesting agents.

36. The system of claim 35 wherein said means for granting includes means for transmitting resource grant message to said requesting one of said plurality of requesting agents.

37. The system of claim 35 wherein each of said plurality of requesting agents further includes release means for transmitting a resource release message to said control means identifying the resources no longer in use.

38. The system of claim 31 further comprising:

a plurality of request queues, each having a plurality of entries and each of said plurality of request queues corresponding to one of said plurality of requesting agents, wherein said control means is associated with each of said plurality of request queues and with said status array, for systematically comparing each entry in each of said plurality of request queues with the entries in said status array to detect an entry in one of said plurality of request queues identifying resources all of which are contained in entries of said status array.

* * * * *